J. D. SULSONA.
CONTROL DEVICE FOR VEHICLES.
APPLICATION FILED JUNE 8, 1911.
1,172,403.
Patented Feb. 22, 1916.
4 SHEETS—SHEET 2.
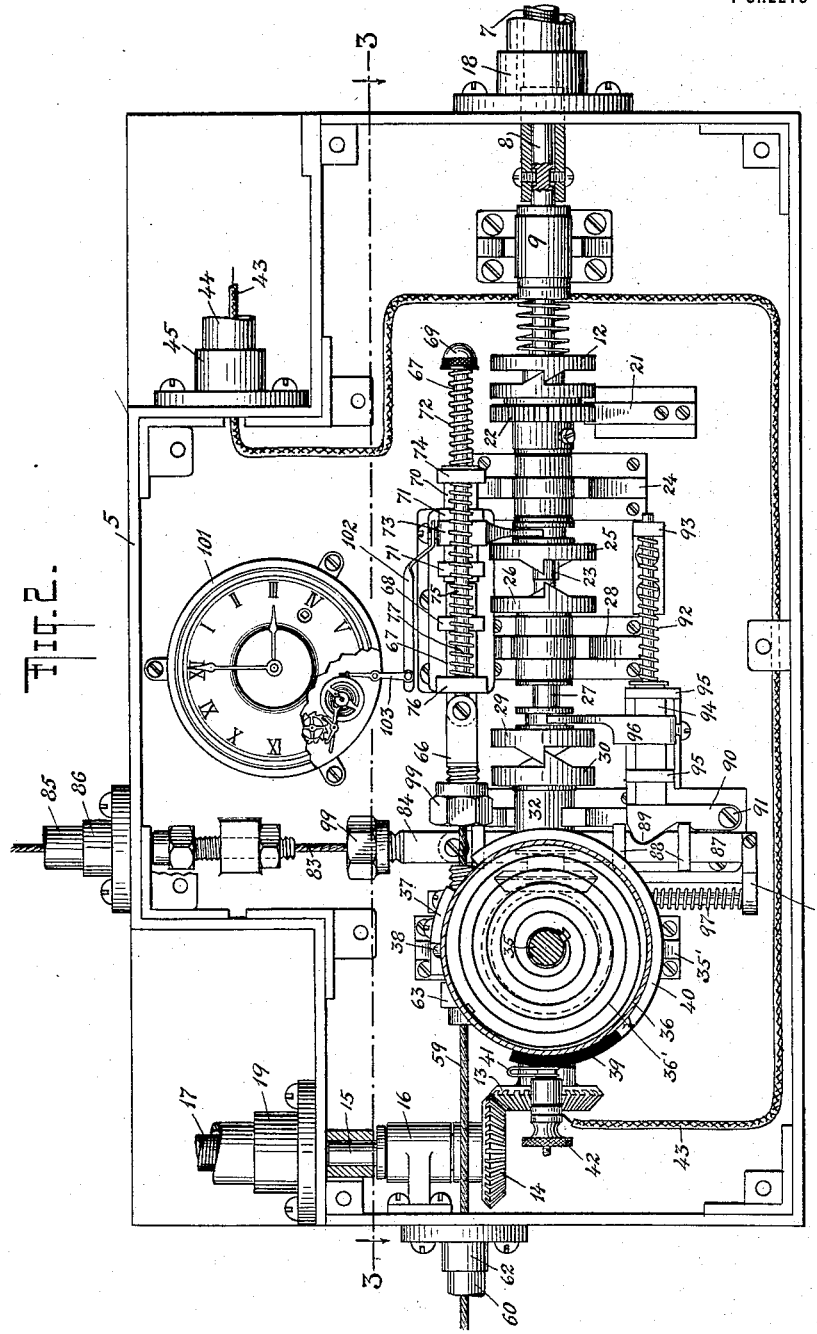
WITNESSES
G. V. Rasmussen
J. A. Ferguson
INVENTOR
JOSEPH D. SULSONA
BY
Bresen & Knauth
ATTORNEYS

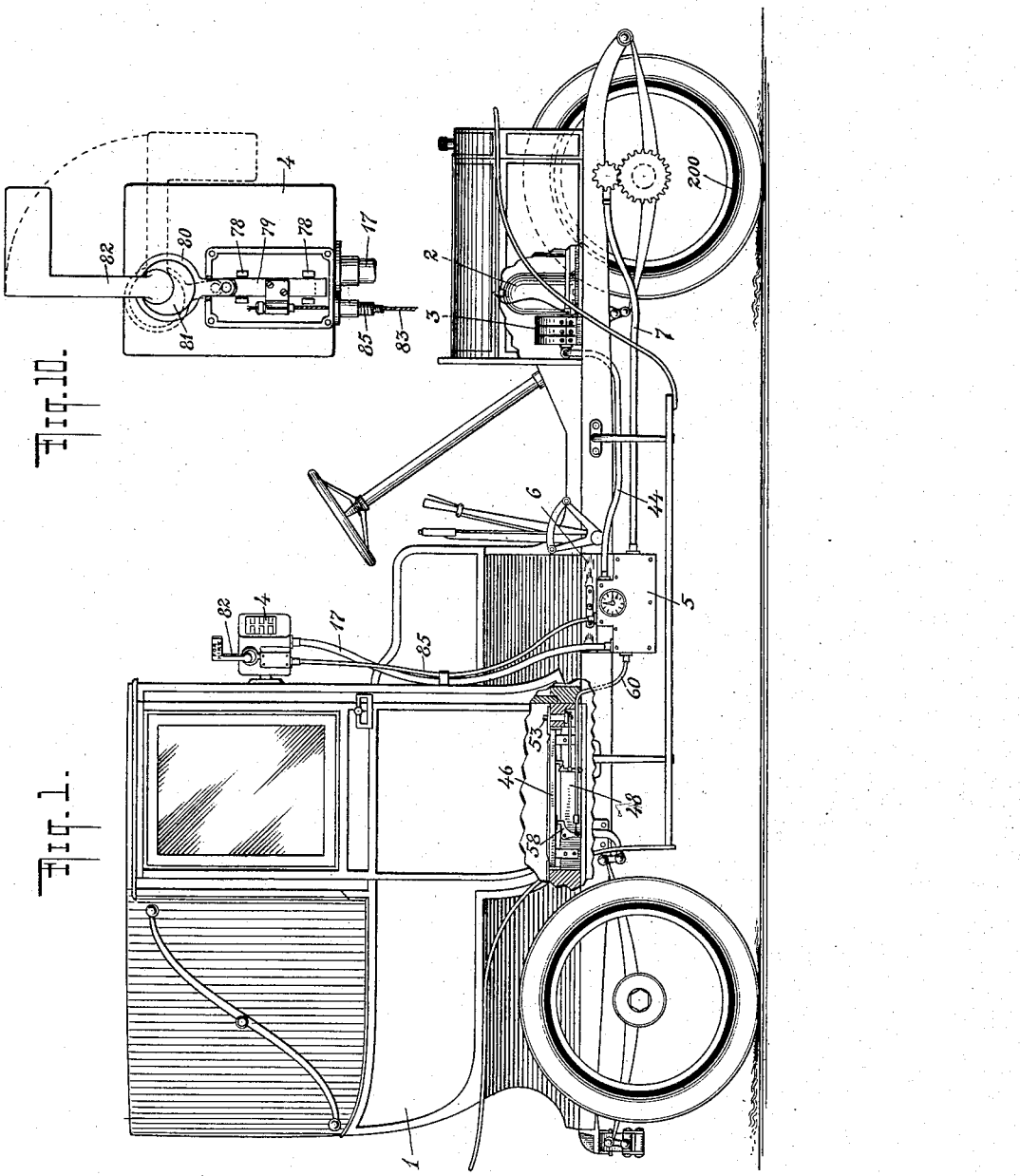

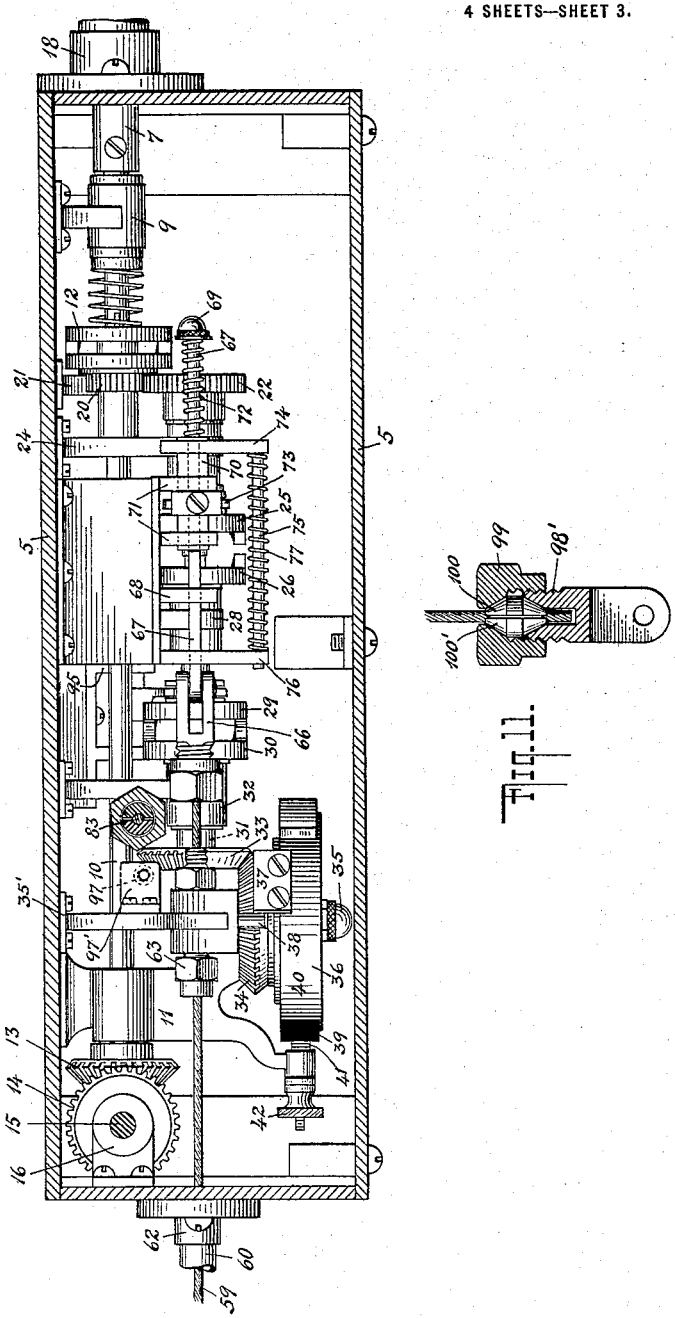

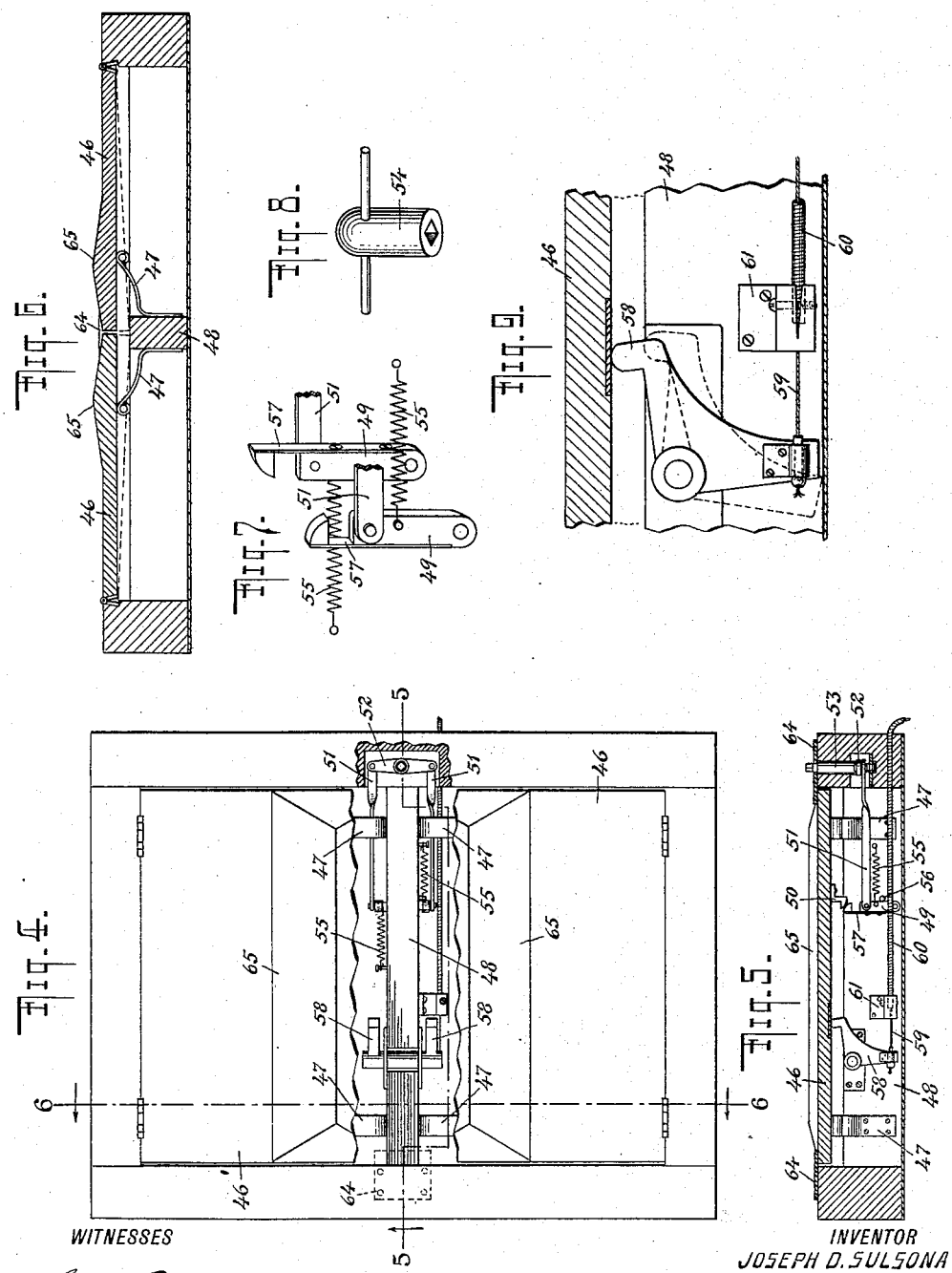

UNITED STATES PATENT OFFICE.

JOSEPH D. SULSONA, OF NEW YORK, N. Y., ASSIGNOR TO TAXIMETER CONTROL COMPANY, OF NEW YORK, N. Y., A CORPORATION OF NEW YORK.

CONTROL DEVICE FOR VEHICLES.

1,172,403. Specification of Letters Patent. Patented Feb. 22, 1916.

Application filed June 8, 1911. Serial No. 631,906.

*To all whom it may concern:*

Be it known that I, JOSEPH D. SULSONA, a citizen of the United States, and a resident of the borough of Manhattan, city, county, and State of New York, have invented a new and useful Improvement in Control Devices for Vehicles, of which the following is a full, clear, and exact description.

My invention relates to control devices for vehicles, especially adapted for use in connection with taxicabs and other motor-vehicles which are provided with registering devices, such as taximeters and the like, and its object is, in part, to produce a device for attachment to such vehicles which, while having no effect upon the regular and ordinary operation of the vehicle with which it is used when the chauffeur thereof has properly performed his required duties with regard to the taximeter, shall make known a neglect of such duties before the vehicle has proceeded beyond a predetermined distance.

A further object of my invention is to provide a control attachment for taxicabs which shall be set into position for operation by the entrance of a passenger into the vehicle and which, in such case, shall be set in motion when the vehicle moves over the ground and give notice after the vehicle has traversed beyond a predetermined distance that the taximeter has not been set to registering position, unless the chauffeur shall have before that distance has been passed over, set the taximeter to such position and by that act also set the control device to a position of inoperativeness.

Another object of my invention is the provision of a control device of such construction as to be positive, reliable and durable in operation and practically impossible of being rendered inoperative or thrown out of order.

A further object is to so construct the control device that even should it get out of order as the result of a destruction of parts, the operation of the car will not be interfered with.

These objects will be more specifically pointed out and explained and others will appear in the following description of the construction and operation of one of the embodiments of my invention which is shown in the accompanying drawings, in which—

Figure 1 shows, in side elevation, a taxicab provided with one form of my control device, certain parts being broken away and others shown in section to illustrate clearly the construction of said device. Fig. 2 shows, in side elevation, the inclosed control mechanism of my device, the cover of the inclosing box being removed and certain parts being broken away or shown in section. Fig. 3 is a plan view of said mechanism, the box being shown in section on line 3—3 of Fig. 2. Fig. 4 is a plan view of the vehicle floor, part being broken away to show the mechanism therebeneath by which the movement of the floor is communicated to the control mechanism. Fig. 5 is a section thereof on line 5—5 of Fig. 4. Fig. 6 is a section thereof on line 6—6 of Fig. 4. Fig. 7 is a perspective view of the catch devices for holding the movable floor in depressed position. Fig. 8 is a perspective view of the catch releasing key. Fig. 9 is an enlarged detail view of the bell-crank lever and associated mechanism shown in Fig. 5. Fig. 10 is a side view of a taximeter equipped with an indicating flag and the associated attachment by which the movement of the flag is communicated to the control mechanism, the cover for the box inclosing said attachment being removed, and Fig. 11 is a longitudinal section of one of the transmission cord gripping devices.

Referring to the drawings and more particularly now to Fig. 1, wherein is shown the arrangement and application of my improved control device with respect to a taxicab, the reference character 1 indicates the taxicab, 2, its engine, 3, the magneto therefor and 4, the taximeter. Mounted upon the chassis of the vehicle at any convenient point, for instance, directly beneath the end of the chauffeur's seat, (Fig. 1), is the inclosing box 5 for the control mechanism of my device. This box is conveniently secured from within to a board 6. the latter being secured to the chassis by bolts or screws which may be sealed in position, preferably by lead seals of special design. The removal of the box thus necessitates the breaking of a seal and the latter cannot be replaced without the use of of a die having the special design. It will be seen that this provision makes it impossible, for one not authorized to do so, to remove the box and tamper with its mechanism without these operations being detected. The fastenings for the cover for the box, for the taximeter attachment and for all other parts may also be sealed in the manner described.

Mounted within the box 5 is the control mechanism of my device, the construction of which is best shown by Figs. 2 and 3. Connected in any well known manner preferably with one of the front wheels 200 of the vehicle so as to be driven thereby is an incased flexible shaft 7 the rear end of which penetrates an aperture in the front end of the box 5. Within the box it is secured in any suitable manner to the shaft 8, mounted in a bearing 9. Coaxial with this shaft is a shaft 10 mounted in bearings 11 and 24 and operatively connected with the shaft 8 by a one-way clutch 12 of any approved design such that the turning of shaft 8 in one direction only is transmitted to shaft 10. On the rear end of the shaft 10 is a bevel gear 13 which meshes with a corresponding bevel gear 14 secured to an upwardly extending shaft 15 mounted in a bearing 16. To the upper end of the shaft 15 is connected an incased flexible shaft 17 which penetrates an aperture in the upper part of the box 5 and is connected with the taximeter 4, so as to operate the latter in any known manner. Non-rotative casings are provided for the flexible shafts and are connected with the box 5 by means of the parts 18 and 19.

It will be seen that the mechanism just described serves to transmit the forward motion of one of the wheels 200 of the vehicle to the taximeter mechanism at all times without interruption. The rearward motion of the vehicle is not thus transmitted because of the slipping of the one-way clutch 12. It will of course be obvious that the flexible shaft 17 may be driven directly from the wheel 200 instead of through the box 5 and by shaft 10.

The teeth of a gear wheel 20 mounted on shaft 10 near the clutch 12 (right hand of Fig. 3) are engaged by a spring pawl 21, to prevent motion of the shaft 10 when the vehicle moves in a rearward direction. These teeth also engage with a gear wheel 22 mounted upon a shaft 23 rotatable in a bearing 24 and held from longitudinal movement by suitable collars engaging the shaft and opposite sides of the bearing.

On the rear end of the shaft 23 is a clutch member 25 mounted thereon so as to rotate with the shaft and to slide longitudinally thereon into and out of position to engage with the coöperating clutch member 26 fixedly secured to the shaft 27 which is mounted coaxially with the shaft 23 in the bearing 28. On the rear end of the shaft 27 is mounted a clutch member 29, arranged to rotate with and be slidable longitudinally on said shaft 27. This member is adapted to coöperate with the clutch member 30 affixed to the shaft 31 arranged coaxially with the shafts 27 and 23 and mounted for rotation in the bearing 32. Suitably disposed collars prevent longitudinal displacement of the shafts 27 and 31.

Affixed to the rear extremity of the shaft 31 is a mutilated bevel gear 33 the teeth of which engage with the teeth of the angularly disposed bevel gear 34 rotatably mounted on a shaft 35 supported by the bearing 35′. Mounted on the same shaft and adapted to be driven by the gear 34 is a switch disk 36. A spirally wound spring 36′ concealed within the disk tends to rotate the latter in a direction opposite to that in which it is driven by the gear 34 and to maintain the disk in zero position, (the position shown in Figs. 2 and 3) with the stop 37 secured to the disk bearing against the fixed stop 38 (which may be cushioned) secured to the bearing 35′. When all the clutch members are in engagement the rotation of the shaft 10 is communicated to the bevel gear 33 which rotates the gear 34 and the switch against the tension of its spring until the region of the gear 33 in which its teeth are broken away or mutilated arrives opposite the teeth of the gear 34. It will be readily seen that under these circumstances the spring will have no opposition to its tension and will expand and thus rotate the switch to zero position.

On the periphery of the disk are fastened a strip 39 of electrically non-conducting material, preferably rubber, and as a continuation thereof a strip 40 of conducting material such as copper or brass. A spring contact member 41 secured to but insulated from a projection of the bearing 11 bears against these strips, in the zero position of the disk against the rubber strip. After the disk has been rotated through a certain predetermined number of degrees, according to the extent of the insulation 39, the contact member comes into contact with the metal strip 40. Electrically secured to the contact 41, by the binding post 42 is an electric conductor 43 preferably an insulated copper wire which extends by any convenient path through an aperture in the box 5 to the magneto 3 of the taxicab motor. Outside of the box 5, this wire in incased by casing 44 secured at one end within the boss 45 on the box 5 and at its other end to the magneto.

In the embodiment of my invention shown in the drawings, a magneto is shown which is in one form or another in general use at the present time and is known as the "Bosch" magneto. It comprises a primary and a secondary winding so arranged that the short circuiting of the former for longer than an instantaneous short circuiting will result in the failure of the latter to furnish arcs at the terminals of the spark plugs in the engine cylinders and thus render the engine inoperative. The insulated wire 43, in this case, is electrically connected in any suitable manner with a portion of the primary winding of the magneto, and its casing 44 serves as a current lead back from the primary winding of the magneto to the box 5. When the switch 36 is in zero position, the contact member 41 rests on the insulated strip 39 and there is consequently no electrical connection between the magneto and box 5 or the mechanism contained therein and the running of the engine is normal as in any motor. When, however, the switch has been rotated sufficiently because of the movement of the vehicle beyond a predetermined distance so that the contact 41 brushes against the metal strip 40, the primary winding of the magneto is brought into electrical connection with the control device of Figs. 2 and 3, through wire 43, post 42, brush 41, strip 40, then through the metallic parts of the device, and thus through casing 44, back to the magneto. The primary winding is thus short-circuited and consequently the ignition is cut out and the engine's operation is interrupted.

The particular means just described for rendering the motor inoperative is illustrative of one method of operation but obviously any other suitable means may be used to effect an interruption in any part of the main operating mechanism, as for example in the ignition circuit or the gasolene or other source of supply, expansive, explosive or electrical, so that after the motor has traveled a certain distance the machine will stop. For some purposes it is not necessary to cause a physical cessation of movement of the car but it will be sufficient to set in motion an emphatic noticeable signal such as an audible alarm; the essence of this invention residing in employment of the motion of the car as the means for making a further comfortable progression thereof, impossible after the machine has started, unless the driver has properly set the taximeter.

The effect of the rotation of the switch 36 through a certain arc from zero position thereof upon the operation of the motor has been set forth as well as the mechanism for rotating the switch and means for transmitting thereto the motion of the vehicle in a forward direction. It has been observed and will be obvious from an inspection of the drawings that the switch is rotated in a direction against the tension of its spring by the movement of the vehicle only when the clutch members 25 and 26, as well as the clutch members 29 and 30, are in engagement with each other. The means for controlling these engagements thus setting the motor controlling means in position for operation or non-operation will now be described.

The floor of the vehicle which must be stepped upon by a passenger in entering therein, as shown particularly by Figs. 4, 5, 6, 7 and 9, is provided with movable sections 46 which are hinged at one side thereof to the side beams of the floor frame, their opposite sides coming into close proximity to each other along a central line extending longitudinally of the vehicle. These ends are held normally in upper position, in which the sections may be substantially in a horizontal plane, by springs 47. A slight pressure only is necessary to depress these sides to their lower position, as shown in dotted lines in Fig. 6, in which they rest upon a rigid longitudinal beam 48. It will readily be seen that the entrance of a passenger will produce this result. Pivoted to the beam 48 on both sides thereof are oppositely disposed catches 49 which coöperate with suitably positioned hooks 50, one being secured to the bottom of each movable floor section, so as to hold said sections in depressed position. Longitudinally extending bars 51 connect these catches with the ends of a transversely extending walking beam or lever 52 pivoted on a shaft 53 vertically disposed in a fixed portion of the floor. The end of the shaft 53 extends above the surface of the floor and is provided with a squared end so as to be engaged by a key 54 shown by Fig. 8. Pressure on either or both of the floor sections 46, will obviously result in the engagement of one or both the hooks 50 with the corresponding catches 49, one of said catches moving in one direction to accomplish this engagement and the other moving in an opposite direction, because they are connected to the opposite ends of the pivoted lever 52 by the bars 51. The hooks 50 have cam surfaced ends to coöperate with similar ends of the catches to produce this movement of the latter against the force of the springs 55 opposing this movement and tending to hold the catches into contact with one or more stops 56 on the beam 48. The upper ends of the catches are resiliently secured to the pivoted portions thereof by leaf springs 57, so that if the pivoted portions are held from movement in an attempt to render the device inoperative, the upper ends may nevertheless move when the hooks 50 are pressed against them, so as to insure their coöperating with said hooks to lock the movable sections of the floor in depressed position. When it is desired to release the sections, the key 54 ordinarily carried by the chauffeur, is applied to the squared projecting end of the shaft 53 and is turned to move the catches against the tension of the springs 55 to release the catches from the hooks 50 which then are immediately moved out of locked position by the action of the springs 47 upon the floor section. Also pivoted on the beam 48 one on each side thereof are levers 58. These levers are operatively connected together and are provided with upwardly extending portions which rest against the lower surfaces of the movable floor sections 46, metallic plates being secured to the sections at these points of engagement to prevent excessive wear of the floor sections. At least one of the levers 58 is a bell crank lever and to the lower end of this lever is firmly secured the end of a transmission cord 59, the other end of which extends beneath the floor of the vehicle to transmit the motion of the bell crank lever to the clutch member 25 in the box 5. This cord, preferably comprises the inner movable member of a device known as the "Bowden wire mechanism." This member is composed of closely twisted piano wires and is surrounded by a flexible casing 60, one end of which is immovably attached to the beam 48 by a clamp 61, and the other end of which is firmly affixed within the boss 62 attached to and surrounding an opening in the rear end of the box 5. Through this opening the inner member 59 extends and after traversing a guide 63 is secured to the parts for operating the movable clutch member 25. It will be seen that the entrance of a passenger into the vehicle will move the floor sections to depressed position resulting in the operation of the levers 58 to a position shown in dotted lines in Fig. 9, thus operating the cord 59 to throw the clutch member 25 into mesh with the clutch member 26. Furthermore it will be seen that pressure on either or both of the movable floor sections will accomplish this result and that when the floor sections are depressed, they will be maintained in such position by the catches 49 and hooks 50. To restore the floor to its upper position, it is necessary for the chauffeur to release the catches by the application of the key 54 to the shaft 53, whereupon the springs 47 will force the floor upward against the plates 64 secured to fixed portions of the floor and extending over the movable portions thereof. This will also result in a release of the clutch member 25 from its engagement with the clutch member 26. The movable floor sections are provided with raised portions 65 so that the chauffeur may not prevent the operation of the passenger-operative devices just described by placing boards over the floor.

After being passed through the guide 63, the cord 59 is secured substantially taut in a gripping device 66 which will be particularly described hereinafter. The gripping device is pivotally fastened to the rod 67 slidably held by a guide 68 which is fastened to the box 5. The outer end of the rod 67 is reduced in diameter, formed circular in section and provided with a nut 69 and a surrounding sleeve 70. This sleeve is exteriorly angular in form and slides in guides 71; and between its outer end and the nut 69 is coiled a spring 72. Secured to the sleeve 70 is a yoke 73, its forks extending downwardly to engage in an annular recess in the clutch member 25. Secured to and extending laterally from the sleeve 70 is an abutment 74 to which is attached the end of a longitudinally extending rod 75. The other end of this rod pierces and is guided by a guide 76 between which and the abutment 74 and surrounding the rod 75 is a coiled spring 77 of a strength less than that of the spring 72. The spring 77 tends to force the abutment 74 and hence the sleeve 70, the yoke 73 and the clutch member 25 in a forward direction so as normally to keep the clutch members out of engagement. The outward thrust of the sleeve 70 is communicated to the spring 72 and thus to the rod 67 so that normally the rod 67 and the cord 59 are held in their extreme position to the right as shown in Figs. 2 and 3. When the floor 46 is depressed, the cord will be pulled to the left, this movement being communicated to the rod 67 and through the spring 72 to the sleeve 70, in opposition to the weaker spring 77, the rod 75 sliding in the guide 76, and ultimately to the clutch member 25 which is thus forced longitudinally of its shaft in position to engage with the opposite clutch member 26. In this movement the yoke 73 is brought from its stop position against the forward guide 71 to its stop position against the rear guide 71; the yoke and the clutch member 25 therefore cannot move farther to the rear. Further movement of the cord 59 and the rod 67 will not be communicated to the clutch member, but will merely result in producing a contraction of the spring 72. This construction, as will readily be seen, permits of the proper engagement of the clutch members without requiring a careful and nice adjustment of the extent of travel of the pulling cord so that it will correspond to the proper extent of travel of the clutch members.

Secured to the taximeter 4 which may be of any design having a chauffeur operative controlling means such as a lever or flag for setting its mechanism into or out of operative connection with the transmission means from the vehicle wheel, is an attachment for transmitting the movement of the lever to the clutch member 29 in the box 5. As shown this attachment consists of a sealed box in which are guides 78 in which slides a bar 79 to which is pivoted or otherwise secured a band 80 surrounding an eccentric 81 on the pivotal shaft of the flag 82. Within the box is secured in any suitable manner the movable member 83 of a "Bowden wire mechanism", which extends into the box 5 and is secured to a gripping device 84, similar in construction to the gripping device 66, which is operatively connected with the movable clutch member 29. A casing 85, similar to the casing 60, surrounds the movable member 83 and is fixedly secured to the taximeter and to a boss 86 on the box 5. The gripping device 84 is pivotally fastened to the rod 87 slidably mounted in guides 88, the rod being provided in its edge, with a cam recess into which normally projects the cam projection 89 of a lever 90 pivoted to the box at the point 91. The projection is normally held in the recess by a spring 92, one end of which abuts against a stop 93 and the other end of which exerts a pressure on a slide 94 operating in guides 95, the rear end of the slide being in contact with the back of the lever 90 opposite the projection 89. To the slide 94 is secured a yoke 96, the forked ends of which engage in an annular groove in the clutch member 29. It will be seen that the spring 92 serves normally to maintain the clutch member 29 in engagement with the coöperating clutch member 30, the cam projection 89 being held within the recess in the rod 87. The recess is normally positioned opposite the cam projection by virtue of the spring 97, one end of which abuts a stop 97' affixed to the box 5, the other end exerting a pressure on a projection 98 of the rod 87. When the flag 82 is in the position, called the inoperative or up-position, in which the taximeter is not set for registering, the springs 92 and 97 serve to maintain the cam 89 seated within the recess of the rod 87, the clutch member 29 being in engagement with the clutch member 30. When the flag is moved to its down-position, in which the taximeter is set for registry, the tension cord 83, as will be obvious, is pulled, this resulting in a movement of the rod 87 against the spring 97. The movement of the rod 87 is transmitted to the lever 90 because of the coöperation of the cam surfaces of the recess and the cam projection and the movement of the lever 90 causes a sliding movement of the slide 94 to the right of its position as shown in Figs. 2 and 3, against the tension of the spring 92 and ultimately, obviously, the disengagement of the clutch member 29 from the clutch member 30. A greater movement of the cord 83 and the rod 87 than is required to move the member 29 properly out of engagement with the member 30 has no effect on the movement 29 as will be clearly understood. A nice adjustment of the travel of the cord 83 to the proper travel of the clutch member 29 is therefore unnecessary.

The gripping devices 66 and 84 are illustrated in detail in Fig. 11 and each comprises a centrally apertured member having an externally screwthreaded portion 98' and having an axial cone-shaped recess at one end upon which is screwed a nut 99 similarly apertured and provided with a similar recess. Within the double-coned recess formed when the nut is in position on the member is a longitudinally split double-coned inner member, the parts 100 and 100' of which are pressed radially toward each other by the coöperation of the conical surfaces when the nut is screwed upon the member. The cord 59, or 83, is threaded through the aperture in the nut and extends between the halves 100 and 100' of the double-coned member each of which is longitudinally grooved slightly to accommodate the cord, and the nut is screwed firmly in place. This action as will be clearly understood, exerts a powerful gripping force to hold the cord between the split members of the double-coned device.

Secured within the box 5, its face visible from without, is a clock or other time recording device 101. Adapted to be moved to interfere with the mechanism of this device, to oppose or stop its operation preferably by engaging with the escapement in the case of a clock, is a bar 102 one end of which may be secured to the yoke securing screw for the yoke 73 for operating the clutch member 25. The other end of said bar may be connected with an interfering lever 103. In the position in which the clutch member 25 is out of engagement with the clutch member 26, the bar 102 and lever 103 are operated to oppose the operation of the clock mechanism. When the clutch member 25 is moved into engagement with the clutch member 26, by the entrance of a passenger into the cab, as previously explained, the bar 102 and lever 103 are moved to disengage with the clock mechanism whereupon the clock starts to record time, which it will continue to do until the clutch member 25 is returned to its original position, as when the chauffeur releases the floor catch devices by the application of his key. Thus it will be seen that the time during which the vehicle is occupied by a passenger or a number of passengers in succession will be recorded. This attachment, as will be clearly understood, operates independently of the taximeter attachment and the mechanism for incapacitating the vehicle motor and is therefore specially adapted for use in connection with vehicles, however propelled, which are not necessarily provided with taximeters or the like. Any other suitable means for controlling the clock may be used.

The operation of the device is a follows: Assuming that the parts of my device are in the position shown by the drawings, the platform or floor sections 46 being in raised position and the flag of the taximeter up, indicating that the meter is not set for registering, it will be apparent that the vehicle is free to travel unobstructedly. As soon however as a passenger enters, he will depress one or both of the floor sections, and the floor sections will be locked in depressed position by the catch devices. The downward movement of the floor sections actuates the bell-crank lever 58, this exerting a pull on the cord 59 which within the box 5 operates the clutch control mechanism already clearly described and results in the inter-engagement of the teeth of the clutch members 25 and 26. This sets the device so that the movement of the wheel 200 will be imparted to the disk 36, whereby the magneto will be short circuited after the vehicle has traveled far enough to effect a contact between the metallic strip 40 of the disk 36 and the brush 41. If now, the engine being in operation, the chauffeur manipulates the proper levers for driving the vehicle by the power of the engine, and throws the taximeter flag, he will disconnect clutches 29 and 30 and thus prevent movement of the disk 36 and avoid short circuiting his magneto. If, however, he neglects his duty of turning the taximeter flag to the operative or down-position, shown by dotted lines in Fig. 10, the vehicle will start to move over the ground, and the magneto will function normally until the disk 36 has rotated far enough to bring its metallic strip 40 into contact with brush 41, at which moment the magneto is short circuited and the ignition ceases. The car is thus brought to a stop and will not be able to proceed unless the flag is thrown. The gearing is preferably so designed that the vehicle may travel about 200 feet before the switch has rotated through a sufficient arc so that the contact spring 41 is no longer in contact with the insulating strip 39, but contacts with the conducting strip 40. This distance may, of course, be varied to any desired extent. When this predetermined distance has been passed over, if the chauffeur has still neglected to place the taximeter in registering condition by turning down the flag, the contact 41 will come into contact with the metal strip 40, thus short circuiting the magneto. The vehicle may move a further short distance because of its momentum, but since the contact 41 will still press upon the strip 40, the engine will not again start nor can the chauffeur start it by cranking without turning down the flag. If the vehicle traverses a very considerable distance after the stopping of the engine because, for instance, it happens to be running down an incline, the switch will be rotated until the mutilated portion of the gear 33 comes opposite to the teeth of the gear 34, whereupon the spring in the switch will rotate it in the opposite direction to zero position. The magneto will again begin to give a spark, but the vehicle, as will be clearly understood, will proceed only a short distance before the engine will again stop, and in time the vehicle will cease to move altogether and come to a position of rest where no manipulation of the chauffeur short of releasing the floor catches in the vehicle or throwing the flag will enable the vehicle to proceed. But if the chauffeur releases the floor catches, the pressure exerted on the floor by the passenger will immediately reset the device so that it will stop after 200 feet. If, however, at any time the flag is turned down, a pull will be exerted on the cord 83, as has been pointed out, and this motion will operate on mechanism already described, so as to produce a disengagement of the clutch members 29 and 30. Under these circumstances, it is apparent that the switch will be returned by the action of its spring to zero position, this rotation reversing the normal motion of the shaft 31 and the engine will continue to operate normally or if not running may be started by cranking without any opposition because of my device. The flag being down, the taximeter mechanism is properly connected with the flexible shaft 17, so as to operate and record in the usual manner.

My device, it will be seen, serves effectively to require the chauffeur to set the taximeter in operative position when a passenger is being carried by the vehicle, but its mode of operation allows him a convenient space of time after the passenger has entered and after the vehicle has started before this setting need be accomplished. The entrance of the passenger operates to set the device for operation while the turning down of the taximeter flag operates to set it for non-operation, acting counter to the passenger operative means. The operation of the device is due to the movement of the vehicle.

When the passenger has alighted, the application of the key 54 to the shaft 53 will result in the springing up of the depressed floor sections to their upper position, and this act compels the driver to inspect his car after each trip, that being the law in some States. When the passenger has alighted and the flag is thrown up, the driver may proceed about 200 feet before using this key and this prevents blocking of traffic where many vehicles are in line ready to discharge passengers at one point.

When no passenger is carried and the floor is in upper position, no interruption to the progress of the vehicle will result, no matter what may may be the position of the taximeter flag. It will be seen that the working of my device in no way interferes with the usual operation of the vehicle or with the operation of the taximeter.

If the device of my invention is injured as the result of a collision or accident, the motor will be free to operate and the car can proceed to its destination and to the garage under its own power since my device does not positively block any operative part of the mechanism, but tends negatively only to cause some one of these parts to function abnormally when my device is in good running condition. Nor does my device interfere with the progress of the vehicle in case it is completely disabled and is towed by another vehicle although there may be a person inside and the floor in depressed condition and the flag up.

I claim:

1. In a motor vehicle a device operated from a wheel of the vehicle during progression for automatically causing the said progression to cease, means for setting said device in operative position and separate means for setting said device in inoperative position.

2. In a motor vehicle a device operated from a moving part of the vehicle during progression for automatically causing the said progression to cease, and passenger controlled means for setting said device into condition for operation.

3. In a motor vehicle a device operated from a moving part of the vehicle during progression for automatically causing the said progression to cease, passenger controlled means for setting said device into condition for operation, and driver controlled means for setting said device out of operative condition.

4. In a motor vehicle a device operated from a moving part of the vehicle during progression for automatically causing the said progression to cease after a predetermined distance has been traversed by the vehicle, means for setting said device in operative position and separate means for setting said device in inoperative position.

5. In a motor vehicle the combination of a vehicle propelling means and a device operated from a moving part of the vehicle during progression, said device comprising means for successively causing an operative and inoperative condition in the vehicle propelling means.

6. In a motor vehicle the combination of vehicle propelling means, a device adapted to cause certain notice to be given to the occupants of the vehicle, said device comprising means to effectuate a break in the vehicle propelling means after said device has operated through a predetermined distance, passenger controlled means for setting said device in operative position and driver controlled means for setting said device in inoperative position.

7. In a motor vehicle the combination of means for normally operating the vehicle, means for causing an abnormal condition, passenger controlled means for setting said second named means into condition for operation, means controlled by the action of the first named means for operating said second named means, and driver controlled means for setting said second named means out of said operating condition.

8. In a motor vehicle a device, a passenger operated connection between it and the passenger part of the vehicle, a driver operated connection between it and the driver part of the vehicle, and a vehicle operative connection between it and a wheel of the vehicle.

9. In a motor vehicle a device, a connection between it and the passenger part of the machine, a second connection between said device and the driver part of the machine, a third connection between said device and the moving part of the vehicle and means controlled by said device so as to function it after the first and third named connections have been actuated and until the second named connection is actuated.

10. In a motor vehicle, the combination of means operative by the movement of the vehicle for controlling the motor, passenger controlled means for setting the first mentioned means in operative position and driver controlled means for setting the first mentioned means in inoperative position.

11. In a motor vehicle, the combination of means operative by the movement of the vehicle for controlling the motor, passenger operative means for setting the first mentioned means in operative position and chauffeur operative means for setting the first mentioned means in inoperative position.

12. In a motor vehicle, the combination of means operative by the movement of the vehicle for rendering the motor inoperative, means to set the first mentioned means in position for operation, chauffeur operative means, and means operatively connected with said chauffeur operative means for setting the first mentioned means in inoperative position.

13. In a motor vehicle, the combination of chauffeur operative means, motor-controlling means operative by the movement of the vehicle, means for setting said motor-controlling means in operative position and means operatively connected with the chauffeur operative means, for setting said motor-controlling means in inoperative position, whereby when said means for setting the motor-controlling means in operative position is actuated, said chauffeur operative means and therefore said means for setting said motor-controlling means in inoperative position must be actuated to insure continuous propulsion of the vehicle.

14. In a motor vehicle, the combination of motor-controlling means operative by the movement of the vehicle, means operative by the chauffeur for controlling said motor-controlling means and additional means operative by the passenger for controlling said motor-controlling means, whereby when the passenger-operative means is actuated the chauffeur-operative means must be actuated to insure continuous propulsion of the vehicle.

15. In a motor vehicle, the combination of a device for interrupting the operation of the motor, transmission-means for causing the operation of said device when the vehicle is in motion, means for setting said transmission-means in operative position and chauffeur operative means for setting said transmission-means in inoperative position.

16. In a motor vehicle, the combination of chauffeur operative control device, warning means operative by the movement of the vehicle for giving notice that the control device is in inoperative position, means for setting said warning-means in operative position and means for setting said warning-means in inoperative position, said last mentioned means being operatively connected with said control device whereby the operation of said chauffeur operative device and therefore said last mentioned means will set the warning-means in inoperative position.

17. In a motor vehicle, the combination of chauffeur-operative means, a motor-controlling device, mechanism operated by the movement of the vehicle for operating said motor-controlling device, passenger-operative means for setting said last mentioned mechanism in operative position to actuate said motor-controlling device to render the motor inoperative, means for setting said last mentioned mechanism in inoperative position and means for operatively connecting said last mentioned means with said chauffeur-operative means whereby when the passenger-operative means is actuated, the chauffeur-operative means must be actuated, to insure the continuous propulsion of the vehicle.

18. In a motor vehicle, the combination of a chauffeur controlling means, a device for interrupting the operation of the motor, transmission means for causing the operation of said device when the vehicle is in motion, clutch mechanism, a depressible floor, a connection between the clutch mechanism and the depressible floor whereby depressing the floor operates the clutch mechanism to set the transmission means in operative position, other clutch mechanism and a connection between the last mentioned clutch mechanism and the chauffeur operative means whereby the setting of the latter to operative position operates the last mentioned clutch mechanism to set the transmission mechanism in inoperative position.

19. In a motor vehicle, the combination of a shaft adapted to be driven by the rotation of one of the wheels of the vehicle, a second shaft, clutch members on said shafts, clutch operating mechanism for engaging and disengaging said members and comprising spring means for normally holding said members out of engagement, a depressible floor, means for communicating the downward movement thereof to the clutch operating mechanism to cause engagement of the clutch members against the force of the said spring, a third shaft, clutch members on the second and third shafts, another clutch operating mechanism for engaging and disengaging said last mentioned clutch members and comprising spring means for normally holding said members in engagement, chauffeur operative means, a connection between said chauffeur operative means and said last mentioned clutch operating mechanism, whereby the setting of the former to operative position results in the operation of the latter to cause the disengagement of the last mentioned clutch members, a mutilated bevel gear on the last mentioned shaft, and a motor interrupting device comprising a bevel gear adapted to be driven by said mutilated bevel gear, a rotatable switch secured to said bevel gear and comprising a peripheral strip of insulating material, a peripheral strip of conducting material, a spring pressed contact member, a spring adapted yieldably to maintain said switch in the position in which the contact member contacts with said insulating strip and an electrical conductor connecting said contact member with a portion of the primary winding of the motor magneto which is insulated from the frame thereof, whereby when the rotation of the aforementioned wheel of the vehicle is communicated to the mutilated bevel gear, the switch will be rotated to move the conducting strip toward the contact member and whereby when, after the rotation thereof through a predetermined number of degrees, the contact member brushes against the conducting strip, the primary circuit of the magneto will be short-circuited.

In witness whereof, I have hereunto set my hand in the presence of two subscribing witnesses.

JOSEPH D. SULSONA.

Witnesses:
 JOHN A. FERGUSON,
 JOHN A. KELLENBECK.